Sept. 6, 1960     F. W. LAWRENCE     2,951,547
ROTARY HARROW

Filed Sept. 24, 1957     3 Sheets-Sheet 1

INVENTOR
F. W. LAWRENCE
BY
ATTORNEY

Sept. 6, 1960     F. W. LAWRENCE     2,951,547
ROTARY HARROW
Filed Sept. 24, 1957     3 Sheets-Sheet 2
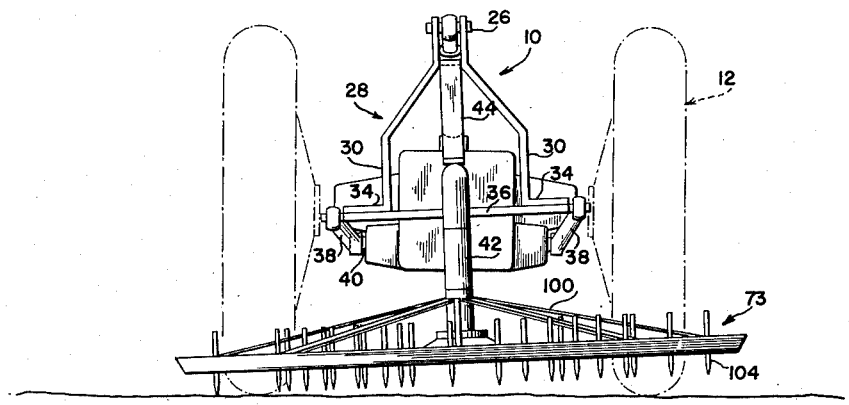
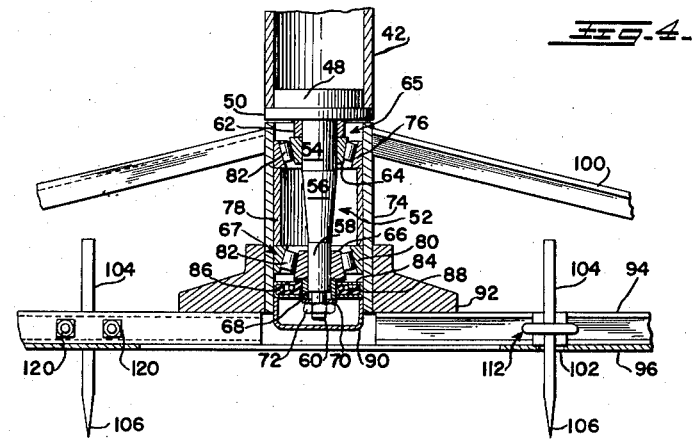
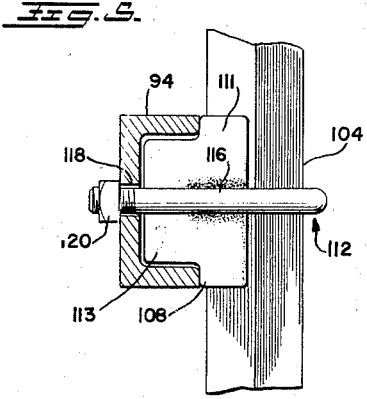
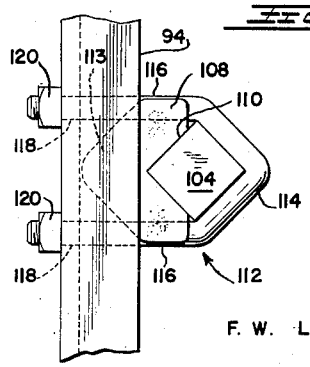
INVENTOR
F. W. LAWRENCE
BY
ATTORNEYS

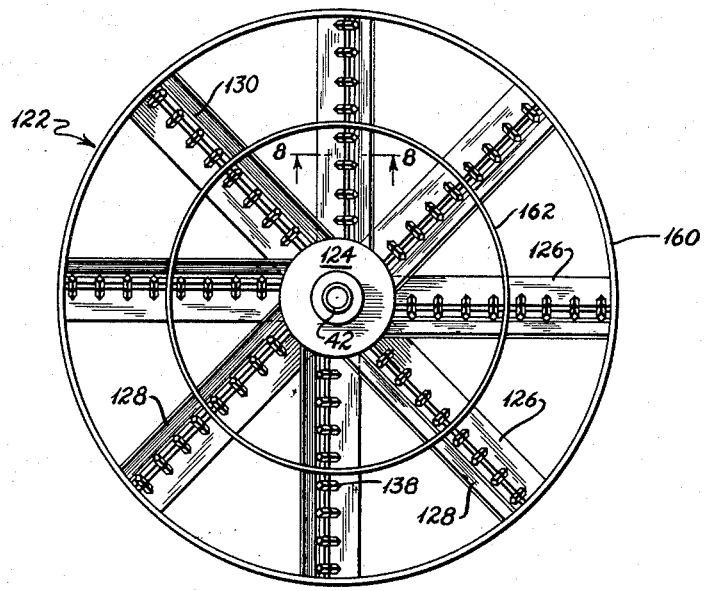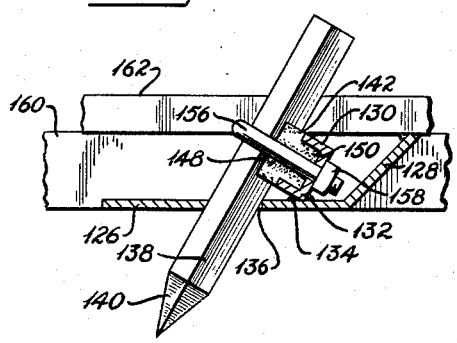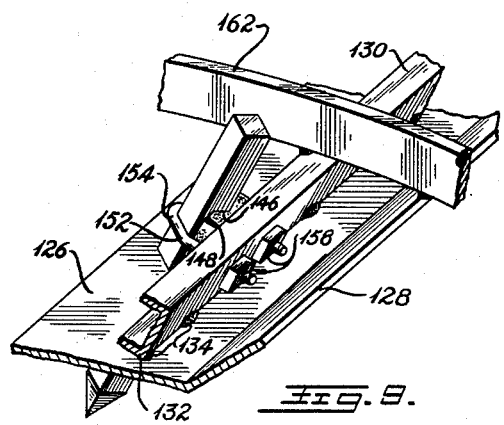

United States Patent Office 2,951,547
Patented Sept. 6, 1960

2,951,547
ROTARY HARROW
Forby W. Lawrence, Selma, Ala.
Filed Sept. 24, 1957, Ser. No. 685,867
2 Claims. (Cl. 172—523)

This invention relates to an agricultural tool and more particularly relates to a rotary harrow for attachment to the rear of a tractor.

In conventional rotary harrows wherein a plurality of harrow teeth extend downwardly from a pan for engagement with the earth, the teeth have generally been fixedly mounted on the pan. As a result of continuous use wherein the harrow teeth engage the discontinuous surface of the earth, rocks and boulders, some of the teeth are subjected to greater wear than others, so that the lengths of the teeth ultimately become unequal. This seriously impairs the effectiveness of the harrow, since it is thereafter incapable of a uniform harrowing of the earth. Another disadvantage of this type of harrow wherein a harrow pan rotates with respect to an axle, has been that dirt and stones tend to become lodged in the bearings between the harrow pan and axle, causing excessive wear and jamming of the harrow pan.

Many rotary harrows have included a positive drive mechanism for rotating the harrow pan and have used motors or engines to drive such mechanism. While these units are generally effective they are quite expensive and require considerable maintenance.

I have now found that these problems and disadvantages can be largely eliminated by a particular rotary harrow construction which forms the object of my invention. According to my invention, a rotary harrow is provided having a rotatable harrow pan with a plurality of teeth extending downwardly from the pan, and having means for individually adjusting the relationship of each harrow tooth with respect to the pan, so that each harrow tooth may be moved upwardly or downwardly with respect to the harrow pan to compensate for wear on that tooth. Thus a harrow is provided having teeth extending a uniform distance below the harrow pan despite uneven tooth wear during use of the harrow.

The harrow pan teeth may extend perpendicular to the pan in a substantially vertical direction downwardly for a digging contact with the earth. Also, as a variation, the harrow teeth may be angled obliquely with respect to the pan so that as the harrow pan is rotated upon movement of the harrow, the harrow teeth on one side of the pan are angled forwardly and downwardly into contact with the earth, achieving a pulling and digging action upon the earth. At this time the harrow teeth on the other side of the pan will be angled backwardly and downwardly to achieve a sliding effect with decreased resistance to the passage of the teeth over the earth. These teeth are angled backwardly to shed any trash or litter impaled on them.

The harrow pan of my harrow is secured to a hollow shaft which is mounted on an axle depending from a frame. A protective cap and shaft seal close the bottom of the hollow shaft, preventing dirt and stones from entering the bearings between the hollow harrow pan shaft and the axle extending from the frame.

The harrow of my invention also provides means actuatable from the tractor for pivotally adjusting the harrow pan with respect to the tractor and with respect to the earth, so that the harrow teeth on either side of a vertical plane extending through the axle and along the path of movement of the harrow may be lowered into dragging engagement with the earth so that forward movement of the harrow causes a rotation of the harrow pan and teeth.

It is accordingly a primary object of the invention to provide a rotary harrow having means for individually adjusting the relation of each harrow tooth with respect to the harrow pan.

It is another object of the invention to provide a rotary harrow wherein all the harrow teeth may be adjusted so that each extends the same distance beneath the harrow pan despite uneven tooth wear.

It is a further object of the invention to provide a rotary harrow having a harrow pan with harrow teeth extending downwardly at an oblique angle with respect to the harrow pan so that the projection of the harrow teeth on the harrow pan is a chord of the pan circle, whereby more effective harrowing of the earth may be accomplished.

It is another object of the invention to provide a rotary harrow having a hollow shaft attached to the pan and having a protective cap covering the lower end of the harrow pan shaft to protect the bearings from dirt.

It is another object of the invention to provide a rotary harrow for attachment to the rear of a tractor including adjusting means actuatable from the tractor for pivotally adjusting the harrow pan to lower either side of the harrow pan into closer engagement with the earth.

It is another object of the invention to provide a rotary harrow having a hollow shaft attached to the pan and removably mounted on an axle.

It is another object of the invention to provide a rotary harrow for attachment to the rear of a tractor including means actuatable from the tractor for pivotally adjusting the harrow pan by increments of any desired amount to lower either side of the harrow pan into position for engagement with the earth.

These and further objects and advantages of the invention will become more apparent upon reference to the following specification and claims and appended drawings wherein:

Figure 3 is a rear elevation of the harrow shown in Figure 1;

Figure 4 is a partial vertical section of the rotary harrow shown in Figure 1;

Figure 5 is a detail vertical elevation partially in section showing the means for holding and adjusting a harrow tooth with respect to the harrow pan;

Figure 6 is a detail plan view of the means for holding and adjusting the harrow tooth shown in Figure 5;

Figure 7 is a plan view of the harrow pan according to an alternative embodiment of the invention;

Figure 8 is a partial vertical section of an alternative embodiment of a harrow pan taken along the line 8—8 in Figure 7; and Figure 9 is a perspective view of the fragment of the alternative embodiment of the invention shown in Figure 7.

Figure 1:
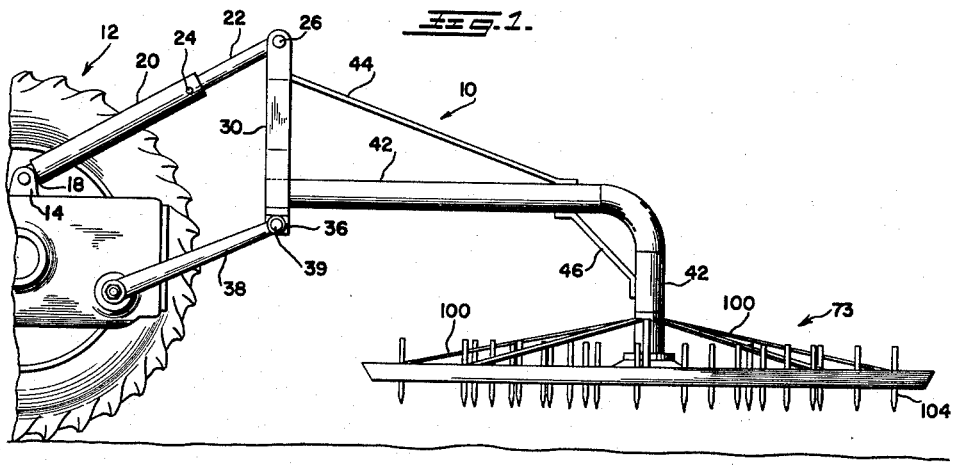
Figure 1 is a side elevation of a rotary harrow constructed according to the invention shown attached to the rear of a tractor.
Figure 2:
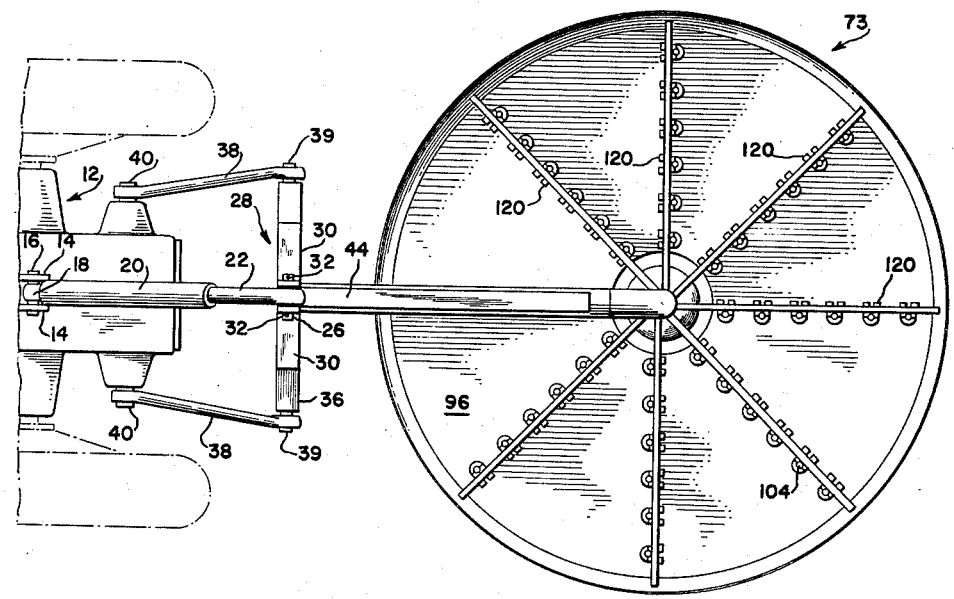
Figure 2 is a top plan view of the harrow shown in Figure 1.

The rotary harrow illustrated in the drawings comprises a frame generally designated 10 pivotally attached to the rear of a tractor 12. This pivotal attachment is effected by two ears 14 which are secured to the frame of the tractor and which receive a bolt 16. The bolt 16 extends between the ears 14 and carries a stud 18 which is rotatably secured to a sleeve 20. A rod 22 is secured in the upper end of sleeve 20 by means of a bolt 24 and rotates integrally with sleeve 20. An eye is formed in the upper end of rod 22 to accommodate a spindle 26 passing therethrough.

A yoke generally designated 28 is suspended from spindle 26 and includes yoke legs 30 which are held on spindle 26 by means of cotter pins 32. The yoke legs 30 have horizontal bottom portions 34 secured to a yoke rod 36 extending between the yoke legs. Conventional tractor lift bars 38 are attached to studs 39 on both ends of yoke rod 36.

These lift bars are mounted on adjusting shafts 40 which are independently rotatable to raise or lower the lift bars 38 different amounts as shown in Figure 3. These lift bars and the means for actuating them comprise conventional tractor construction as will be understood by those skilled in the art. By an unequal movement of the bars under control of the tractor operator the yoke 28 is tilted about a generally horizontal axis as shown in Figure 3.

An L-shaped beam 42 is secured to yoke rod 36 and extends rearwardly and downwardly therefrom. A brace 44 is secured to both yoke legs 30 near the upper ends thereof and extends rearwardly and downwardly to beam 42. Another brace 46 extends between the horizontal and vertical portions of L-shaped beam 42.

Referring to Figure 4, a plug 48 having a flange 50 is secured to the lower end of L-shaped beam 42 in any suitable manner, such as by welding. A stub axle generally designated 52 depends from plug 48 and comprises an upper cylindrical portion 54, a middle portion 56 having the shape of a truncated cone, a lower cylindrical portion 58 having a diameter smaller than that of the upper portion 54, and a bottom stud 60 which is screw threaded. A spacer bushing 62 is mounted on the cylindrical portion 54 of axle 52 and positions the inner race 64 of a thrust type roller bearing 65. A second thrust type roller bearing 67 is disposed on the lower cylindrical portion of axle 52 with its inner race 66 mounted thereon. This roller 66 is positioned by means of a spacer bushing 68 which is urged against the race 66 by means of a washer 70 and nut 72.

A harrow pan generally designated 73 is rotatably mounted on stub axle 52 by means of a central hollow shaft 74. The outer race 76 of the upper roller bearing 65 is received within the upper end of hollow shaft 74 and is positioned therein by means of a spacer tube 78. Bearing 65 is provided with conventional rollers 82. The outer race 80 of lower roller bearing 67 is received in the lower end of hollow shaft 74 abutting spacer tube 78. It will be seen that because of the thrust type nature of the roller bearings 65 and 67 the hollow shaft is pivotally secured to the stub axle 52 by tightening nut 72.

A conventional shaft seal is provided between hollow shaft 74 and spacer bushing 68 and includes a seal housing 84, a flexible sealing member 86 mounted within the seal housing 84 and held in engagement with separator bushing 68 by means of a resilient ring 88. A protective cap 90 closes the lower end of hollow shaft 74 beneath axle 52 and may be screwed into hollow shaft 74 or held within the hollow shaft by frictional engagement.

The pan 73 is fastened to hollow shaft 74 by means of a hub 92 which is secured to the exterior of the lower portion of hollow shaft 74. Secured to the lower face of hub 92 are a plurality of radial support bars or channels 94, having U-shaped cross sections. The base 96 of pan 73 is secured to the bottom of each of the support bars 94 in any suitable manner, such as by welding. The pan is shown as of circular shape but it will be understood that it may have other shapes, such as that of an octagon. An upwardly flared flange 98 is secured to the perimeter of the pan 96 and extends upwardly and outwardly therefrom. A plurality of radial braces 100 having L-shaped cross sections extend from the upper portion of hollow shaft 74 to the upwardly flared flange 98.

The pan bottom 96 is provided with a plurality of apertures 102 at radially spaced intervals adjacent each radial support bar 94. A harrow tooth 104 extends through each aperture 102 and has a point 106 formed at the lower extremity thereof for engagement with the earth. Each harrow tooth has a square cross section and is mounted on a spacer block 108 which is positioned between the harrow tooth and the adjacent support bar 94. The spacer block 108 has a V-shaped slot 110 in its face 111 and this face is of a width substantially equal to the width of the U-shaped bar 94 as may be seen in Figure 5. The bottom 113 of block 108 is of a lesser width and is received within the channel 94. The harrow tooth 104 is mounted in the slot 110 and is secured to the channel 94 by means of U-shaped bolt 112 which holds the harrow tooth and spacer block in firm engagement with the support bar or channel. The bight of each bolt 112 has a V-shape 114 to mate with the surface of harrow tooth 104. The legs 116 of the bolt 112 extend through holes 118 formed in support bar 94 and have screw threads formed on their ends for receiving securing nuts 120.

An alternative embodiment of harrow pan is illustrated in Figures 7, 8 and 9. The harrow pan is generally indicated at 122 and is rotatably attached to a frame such as the frame 10 shown in the embodiment of Figure 1 by a hub 124 rotatably secured to the lower end of a beam 42 similar to that shown in Figure 1. A plurality of pan plates 126 are secured, as by welding, to the bottom of hub 124 and extend radially outwardly. It will be seen that there are open segments between the plates 126 and each plate 126 has a flange 128 extending upwardly diagonally along one edge. A channel member or support bar 130 extends radially outwardly of each pan plate 126. The lower inside edge 132 of each channel member 130 is welded to a pan plate 126 at weld spots 134 with the channel member 130 at an angle with respect to pan plate 126, as seen in Figure 8.

Each pan plate 126 is provided with a plurality of apertures 136 at radially spaced intervals adjacent each channel member 130 and a harrow tooth 138 extends downwardly through each aperture 136 at an oblique or slanted angle with respect to the pan plate 126. The projection of the harrow tooth 138 on the pan plate 126 is a portion of chord of the circle of the harrow pan 122. Each harrow tooth 122 terminates in a point 140. Each harrow tooth has a square cross section and is mounted on a spacer block 142 which is positioned between the harrow tooth and the adjacent channel member 130. The spacer block 142 has a V-shaped slot 146 in its outer face 148 and this face is of a width substantially equal to the width of the channel member 130. The bottom 150 of the spacer block 142 is of lesser width and is received within channel member 130. The harrow tooth 138 is mounted in slot 146 and is secured to the channel 130 by means of a generally U-shaped bolt 152 which holds the harrow tooth and spacer block in firm engagement with the channel member. The bight of each bolt 152 has a V-shape 154 to mate with the surface of harrow tooth 138. The legs 156 of the bolt 152 extend through holes formed in the channel member 130 and have screw threads formed on their ends for receiving nuts 158. In order to maintain the pan plates 126 in fixed relation to one another, a peripheral rim 160 is secured to the outer ends of each pan plate 126. An intermediate reinforcing ring 162 is secured, as by welding, to each of the channel members 130 and to the flanges 128.

In operation of the embodiment of the invention shown in Figures 1 to 6 the lift arms 38 may be equally raised as shown in Figure 1 to allow the harrow to be transported to the desired spot. The lift arms 38 may then be rotated downward unequal amounts to cause the harrow to tilt as shown in Figure 3. In this position the leftmost teeth engage the ground and cause the harrow to rotate in a counterclockwise direction as the tractor moves. As individual teeth become worn, after repeated use, they may be adjusted downwardly by simply loosening the nuts 120 on U-bolts 112. It will be noted that the tooth mounting is not disassembled by such action in that the bottom portion 113 of block 108 is retained within the channel of the bar 94, even though loosely so as to permit easy adjustment. Only a wrench or pair of pliers is necessary for making the adjustment which is so simple as to be easily made in the field. The teeth used in the harrow are of the simplest type of construction and while shown as square could also be round. In this event the slot in the block may be either V-shaped or circular. The blocks can be very economically cast and the U-bolts merely purchased. Where there is any tendency for the teeth to stick at the time adjustment is made a hammer blow on top of the tooth is normally adequate to dislodge it without doing any damage to the tooth or tooth clamping arrangement. While the unit shown in the drawings is supported directly from the tractor it is to be understood that other support arrangements, such as wheels, may also be used.

In the operation of the harrow including the alternative harrow pan embodiment shown in Figures 7, 8 and 9, the teeth on one side of the harrow pan are angled forwardly with respect to the line of motion of the harrow pan and achieve a pulling, lifting and digging effect in efficiently harrowing the soil. The teeth on the other side of the harrow pan are angled backwardly so that there is a sliding effect and less resistance to rotation than on the other side of the harrow pan whereby the harrow pan may be rotated with the harrow pan horizontal, parallel to the level of the earth. In addition, the teeth angled backwardly with respect to the ground are caused to readily shed any trash or litter impaled thereon.

Among the many uses of the rotary harrow of the invention is the pulverizing and leveling of land. As the harrow rotates it moves the soil in a circular movement to drag the soil off the high places into tractor tracks and other low places. Many conventional harrows only move the soil in one direction and will not fill tractor tracks and other long trenches which run parallel to the the direction of travel. Further, the harrow of the invention can be used for fallowing land during the summer to control weeds and grass and to maintain moisture for early seeded legumes and small greens.

The harrow of the invention is an excellent tool for lightly scarifying and covering clover and small grass seed without destroying the sod. It is especially efficient for pulverizing and spreading dung droppings from live stock and working them into the soil and sod. The feature of the invention whereby the harrow teeth may be adjusted up and down with respect to the pan is useful not only in adjusting after uneven wear of the harrow teeth but also to control the depth of penetration of the harrow teeth into the soil. The harrow teeth may be adjusted so that the points are a short distance from the lower surface of the pan and thereby only disturb the soil lightly. Thus, a shallow covering may be placed upon seeds, and clods and cattle dung pulverized between the harrow pan and the ground.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A rotary harrow comprising a frame, an axle depending from said frame, a hub rotatably mounted on said axle, a plurality of pan plates extending radially outwardly from said hub, a channel member mounted on each of said pan plates, a plurality of harrow teeth attached to said channels parallel to the base thereof, each of said teeth being attached to said channel members by means of a mounting block having a groove in one face thereof receiving the associated tooth and having a base portion received within the channel, and a U-bolt fitting around the tooth and block and passing through the base of the channel member to secure the tooth and block thereto, said pan plates providing line contact for their associated channel member so that the leg of each channel member forms an acute angle with its corresponding pan plate thereby inclining said teeth to the vertical by an angle the magnitude of which is the complement of said acute angle.

2. A rotary harrow as set out in claim 1 including an upwardly and outwardly extending flange portion integral with each of said pan plates, and a plurality of annular support members secured to each of said channel members and said upwardly and outwardly extending flange portion on each of said pan plates.

References Cited in the file of this patent

UNITED STATES PATENTS

| | | |
|---|---|---|
| 369,600 | Hicks | Sept. 6, 1887 |
| 518,520 | Cromer | Apr. 17, 1894 |
| 714,378 | Jurs | Nov. 25, 1902 |
| 828,148 | Stanley | Aug. 7, 1906 |
| 1,134,832 | Burnam et al. | Apr. 6, 1915 |
| 1,213,566 | Willis | Jan. 23, 1917 |
| 1,396,905 | Wilcox | Nov. 15, 1921 |
| 1,471,692 | Guild | Oct. 23, 1923 |
| 1,747,955 | Schertz | Feb. 18, 1930 |
| 2,215,364 | Simmons et al. | Sept. 17, 1940 |
| 2,381,005 | Schultz et al. | Aug. 7, 1945 |
| 2,556,492 | Dockery et al. | June 12, 1951 |
| 2,580,721 | Beccard | Jan. 1, 1952 |
| 2,699,023 | Caldwell | Jan. 11, 1955 |
| 2,766,675 | Suck | Oct. 16, 1956 |